(12) United States Patent
Morita

(10) Patent No.: US 10,647,598 B2
(45) Date of Patent: May 12, 2020

(54) ANTIMICROBIAL AND ALGICIDAL AGENT FOR COOLING WATER SYSTEM

(71) Applicant: KURITA WATER INDUSTRIES LTD., Tokyo (JP)

(72) Inventor: Akira Morita, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 15/346,240

(22) Filed: Nov. 8, 2016

(65) Prior Publication Data

US 2017/0050869 A1 Feb. 23, 2017

Related U.S. Application Data

(62) Division of application No. 15/022,830, filed as application No. PCT/JP2014/074707 on Sep. 18, 2014, now abandoned.

(30) Foreign Application Priority Data

Sep. 24, 2013 (JP) .................. 2013-197153

(51) Int. Cl.
*A01N 43/80* (2006.01)
*A01N 59/02* (2006.01)
*C02F 1/50* (2006.01)
*C02F 1/76* (2006.01)
C02F 103/02 (2006.01)

(52) U.S. Cl.
CPC ............. *C02F 1/50* (2013.01); *A01N 43/80* (2013.01); *C02F 1/76* (2013.01); *C02F 2103/023* (2013.01); *C02F 2303/20* (2013.01); *Y02W 10/37* (2015.05)

(58) Field of Classification Search
None
See application file for complete search history.

(56) References Cited

U.S. PATENT DOCUMENTS

| 3,761,488 A | * | 9/1973 | Lewis | .................. A01N 43/80 |
| | | | | 106/18.32 |
| 4,719,083 A | * | 1/1988 | Baker | ..................... C02F 1/50 |
| | | | | 210/698 |
| 5,922,745 A | | 7/1999 | McCarthy et al. | |
| 2006/0003023 A1 | | 1/2006 | Williams | |
| 2006/0231505 A1 | | 10/2006 | Mayer et al. | |

FOREIGN PATENT DOCUMENTS

| CN | 1426681 A | 7/2003 |
| CN | 102578131 A | 7/2012 |
| EP | 0913091 A1 | 5/1999 |
| JP | 2006-022069 A | 1/2006 |
| JP | 2006-022097 A | 1/2006 |
| JP | 2006-297391 A | 11/2006 |
| JP | 2009-084163 A | 4/2009 |
| JP | 2012-036108 A | 2/2012 |
| WO | 2009/104707 A1 | 8/2009 |

OTHER PUBLICATIONS

Machine translation of WO2009/104707.*
Europe Patent Office, "Search Report for European Patent Application No. 14849253.1," dated Apr. 20, 2017.
China Patent Office, "Office Action for Chinese Patent Application No. 201480051167.9," dated May 29, 2018.

* cited by examiner

*Primary Examiner* — Alton N Pryor
(74) *Attorney, Agent, or Firm* — Manabu Kanesaka

(57) ABSTRACT

An antimicrobial and algicidal agent for cooling water system contains an antimicrobial agent and an isothiazolone-based compound that effectively kill and remove the algae grown in the cooling water system.

3 Claims, No Drawings

ANTIMICROBIAL AND ALGICIDAL AGENT FOR COOLING WATER SYSTEM

RELATED APPLICATIONS

The present application is a divisional application of U.S. patent application Ser. No. 15/022,830 filed on Mar. 17, 2016, which is a national phase entry of International Application No. PCT/JP2014/074707 filed on Sep. 18, 2014, which claims priority from Japanese Application No. 2013-197153 filed on Sep. 24, 2013, the disclosure of which are incorporated herein by reference.

FIELD OF INVENTION

The present invention relates to an antimicrobial and algicidal agent that can effectively kill and remove the algae generated in a cooling water system subjected to an antimicrobial treatment using a chlorosulfamic acid and/or a chlorosulfamic acid salt (hereinafter referred to as a "chlorosulfamic acid (salt)" in some cases).

BACKGROUND OF INVENTION

In cooling water systems of various types of industrial plants, when slime is generated in the system, slime troubles, such as decrease in thermal efficiency, clogging of water passage pipes, and corrosion of piping metal materials, occur. In order to avoid the slime troubles, various types of chemical agents have been developed.

In Patent Literature 1, a slime stripping agent containing a chlorosulfamic acid as an effective component has been disclosed. In Patent Literature 2, an algicidal agent containing a chlorine-based oxidizing agent and a chlorosulfamic acid (salt) has been disclosed.

Patent Literature 3 has disclosed that when slime is generated in a cooling water system during a treatment using sodium hypochlorite, an isothiazolone compound is further added.

CITATION LIST

Patent Literature

Patent Literature 1: Japanese Patent Publication 2003-267811 A
Patent Literature 2: Japanese Patent Publication 2003-267812 A
Patent Literature 3: Japanese Patent Publication 2006-297391 A

SUMMARY OF INVENTION

In a cooling water system in which an antimicrobial treatment is performed using a chlorosulfamic acid (salt), algae may be generated and proliferated during operation in some cases.

It is expected that algae are removed from the cooling water system by the antimicrobial treatment using a chlorosulfamic acid (salt). However, in a cooling water system, even when a residual concentration of the chlorosulfamic acid (salt) is sufficiently high, algae may be generated in some cases. The algae thus generated cannot be easily removed by simply increasing the addition amount of the chlorosulfamic acid (salt).

The present invention aims to provide an antimicrobial and algicidal method and an antimicrobial and algicidal agent for a cooling water system, each of which can effectively kill and remove algae generated in a cooling water system subjected to an antimicrobial treatment using a chlorosulfamic acid (salt).

Solution to Problem

The present invention is as described below.

[1] An antimicrobial and algicidal method for a cooling water system characterized in that in a cooling water system subjected to an antimicrobial treatment using a chlorosulfamic acid and/or a chlorosulfamic acid salt, when algae are generated, an isothiazolone-based compound is further added to the cooling water system.

[2] The antimicrobial and algicidal method for a cooling water system according to [1], wherein a residual chlorine concentration of the chlorosulfamic acid and/or the chlorosulfamic acid salt in the cooling water system is 0.5 mg-$Cl_2$/L or more.

[3] The antimicrobial and algicidal method for a cooling water system according to [1] or [2], wherein an addition amount of the isothiazolone-based compound to the cooling water system is 0.1 to 1,000 mg/L.

[4] An antimicrobial and algicidal agent for a cooling water system containing an antimicrobial agent and an isothiazolone-based compound, wherein the antimicrobial agent is a chlorine-based oxidizing agent and a sulfamic acid compound; or a chlorosulfamic acid and/or a chlorosulfamic acid salt.

[5] The antimicrobial and algicidal agent for a cooling water system according to [4], wherein the antimicrobial and algicidal agent is a two-component type in which the antimicrobial agent and the isothiazolone-based compound are separated from each other.

Advantageous Effects of Invention

Slime is an aggregate primarily formed of bacteria and/or extracellular viscous substances derived from fungi. When being tangled with slime, algae may be contained therein in some cases; however, intrinsically, algae are generated from a factor different from that of the slime which is an aggregate derived from fungi. The algae have characteristics different from those of the slime and should be distinguished therefrom in view of removal countermeasure.

The present inventors found that by the use of a chlorosulfamic acid (salt) together with an isothiazolone-based compound, an algicidal effect can be synergistically obtained.

According to the present invention, algae generated in cooling water systems, such as various types of industrial plants, restaurant kitchen systems, showcase refrigeration systems, and air conditioner systems, in each of which an antimicrobial treatment is performed using a chlorosulfamic acid (salt), can be effectively killed and removed.

DESCRIPTION OF EMBODIMENTS

Hereinafter, embodiments of the present invention will be described in detail.

An antimicrobial and algicidal method for a cooling water system of the present invention is characterized in that when algae are generated in a cooling water system subjected to an antimicrobial treatment using a chlorosulfamic acid (salt), an isothiazolone-based compound is further added to the cooling water system.

[Chlorosulfamic Acid (Salt)]

In the present invention, an antimicrobial treatment for a cooling water system using a chlorosulfamic acid (salt) may be performed by addition of a chlorosulfamic acid and/or a chlorosulfamic acid salt to a cooling water system. By addition of a chlorine-based oxidizing agent and a sulfamic acid compound to a cooling water system to produce a chlorosulfamic acid salt in the cooling water system, an antimicrobial treatment for a cooling water system may also be performed.

Hereinafter, a chlorosulfamic acid (salt) to be added for an antimicrobial treatment for a cooling water system or a chemical agent containing a chlorine-based oxidizing agent and a sulfamic acid compound in combination may be referred to as an "antimicrobial agent" in some cases.

A chlorosulfamic acid and/or a salt thereof to be added to a cooling water system may be N-chlorosulfamic acid, N,N-dichlorosulfamic acid, or salts thereof, such as an alkali metal salt including a sodium salt or a potassium salt; an alkaline earth metal salt including a calcium salt, a strontium salt, or a barium salt; another metal salt including a manganese salt, copper salt, a zinc salt, an iron salt, a cobalt salt, or a nickel salt; an ammonium salt, and a guanidine salt. Those compounds may be used alone, or at least two types thereof may be used in combination.

As a chlorine-based oxidizing agent used in the case in which a chlorosulfamic acid salt is generated in a water system by addition of a chlorine-based oxidizing agent and a sulfamic acid compound to a cooling water system, for example, there may be mentioned a chlorine gas, chlorine dioxide, hypochlorous acid or a salt thereof, chlorous acid or a salt thereof, chloric acid or a salt thereof, perchloric acid or a salt thereof, or chlorinated isocyanuric acid or a salt thereof. Among those compounds mentioned above, as a particular example of the salt type, for example, there may be mentioned a hypochlorous alkali metal salt, such as sodium hypochlorite or potassium hypochlorite; a hypochlorous alkaline earth metal salt, such as calcium hypochlorite or barium hypochlorite; a chlorous alkali metal salt, such as sodium chlorite or potassium chlorite; a chlorous alkaline earth metal salt, such as barium chlorite; another chlorous acid metal salt, such as nickel chlorite; a chloric acid alkali metal salt, such as ammonium chlorate, sodium chlorate, or potassium chlorate; or a chloric acid alkaline earth metal salt, such as calcium chlorate or barium chlorate. Those chlorine-based oxidizing agents may be used alone, or at least two types thereof may be used in combination. Among those compounds mentioned above, a hypochlorous salt is easily handled and can be preferably used.

The sulfamic acid compound is preferably a compound represented by the following general formula (1) or a salt thereof.

[Chem. 1]

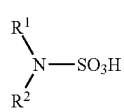

(1)

In the above formula (1), $R^1$ and $R^2$ each independently represent a hydrogen atom or a hydrocarbon group having a 1 to 8 carbon atoms.

As the sulfamic acid compound as described above, for example, beside a sulfamic acid in which $R^1$ and $R^2$ each represent a hydrogen atom, N-methylsulfamic acid, N,N-dimethylsulfamic acid, or N-phenylsulfamic acid may be mentioned. As a salt of the sulfamic acid compound, for example, there may be mentioned an alkali metal salt, such as a sodium salt or a potassium salt; an alkaline earth metal salt, such as a calcium salt, a strontium salt, or a barium salt; another metal salt, such as a manganese salt, a copper salt, a zinc salt, an iron salt, a cobalt salt, or a nickel salt; an ammonium salt, and a guanidine salt. In particular, for example, there may be mentioned sodium sulfamate, potassium sulfamate, calcium sulfamate, strontium sulfamate, barium sulfamate, iron sulfamate, or zinc sulfamate. Those sulfamic acids and the salts thereof may be used alone, or at least two types thereof may be used in combination.

When the chlorine-based oxidizing agent, such as a hypochlorous acid salt, and the sulfamic acid compound, such as a sulfamic acid salt, are mixed together, those compounds are bonded to each other, so that a chlorosulfamic acid salt is formed and is stabilized.

As for the use rate of the chlorine-based oxidizing agent and that of the sulfamic acid compound, with respect to one mole of effective chlorine of the chlorine-based oxidizing agent, 0.5 to 5.0 moles of the sulfamic acid compound is preferable, and 0.5 to 2.0 moles thereof is more preferable. In this case, the effective chlorine of the chlorine-based oxidizing agent is chlorine measured by a residual chlorine measurement method in accordance with JIS K0101.

In the combination described above, in order to improve the storage stability, an alkali, such as sodium hydroxide or potassium hydroxide, is also preferably contained.

The addition amount of the chlorosulfamic acid (salt) to a cooling water system or the addition amounts of the chlorine-based oxidizing agent and the sulfamic acid compound thereto may be set so that when algae are not generated, a sufficient antimicrobial effect is obtained in the cooling water system. Although being changed depending on the operation conditions (flow conditions) of the cooling water system and the adhesion tendency of slime, the residual chlorine concentration derived from the chlorosulfamic acid (salt) in the cooling water system is preferably 0.01 to 50 mg-$Cl_2$/L and particularly preferably approximately 0.5 to 20 mg-$Cl_2$/L. When this residual chlorine concentration is in the range described above, sufficient effects in terms of antimicrobial properties and slime peeling properties can be obtained.

When algae are generated, the residual chlorine concentration derived from the chlorosulfamic acid (salt) is preferably 0.1 to 50 mg-$Cl_2$/L, particularly preferably 0.5 to 20 mg-$Cl_2$/L, and more preferably 1 to 10 mg-$Cl_2$/L. In a cooling water system, as factors influencing on the peeling properties of algae, the type of nutrient source and the amount thereof, the difference in solar irradiation condition, and furthermore, the flow conditions, such as circulation, may be mentioned. For example, when the circulation rate is high, the peeling properties of algae caused by shearing is improved. Hence, in accordance with those factors, a suitable addition amount is preferably adjusted.

When the residual chlorine concentration is excessively low, a sufficient synergistic effect achieved in combination with an isothiazolone-based compound may not be obtained in some cases; hence, the residual chlorine concentration derived from the chlorosulfamic acid (salt) is preferably 0.5 mg-$Cl_2$/L or more.

An addition position of the antimicrobial agent may be similar to the addition position in a general antimicrobial treatment for a cooling water system, and for example, a cooling water pit, a water spray plate, a circulating water line, and a makeup water line may be mentioned. When algae are generated, if the residual chlorine concentration is the above preferable concentration, the antimicrobial agent may be added either in a continuous manner or an intermittent manner.

[Isothiazolone-Based Compound]

An isothiazolone-based compound used in the present invention is preferably a compound represented by the following general formula (2) or (3).

[Chem. 2]

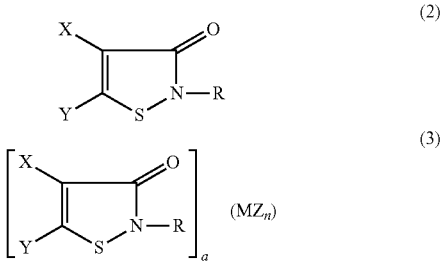

In the above formulas (2) and (3), R, X, Y, M, Z, a, and n are as described below.

R: a hydrogen atom, an alkyl group, an alkenyl group, an alkynyl group, or an aralkyl group, and preferably an alkyl group having 1 to 8 carbon atoms.

X: a hydrogen atom, a halogen atom, or an alkyl group having 1 to 4 carbon atoms.

Y: a hydrogen atom, a halogen atom, or an alkyl group having 1 to 4 carbon atoms (however, in some cases, X and Y are condensed to each other to form a benzene ring).

M: a cationic atom or group selected from the group consisting of an alkali metal, an alkaline earth metal, a heavy metal, and an amine.

Z: an anionic atom or group forming a compound with the cation M which has a sufficient solubility to form a complex compound.

a: an integer of 1 or 2.

n: an integer by which the anion Z satisfies the atomic valence of the cation M.

As the isothiazolone-based compound as described above, for example, 5-chloro-2-methyl-4-isothiazoline-3-one, 2-methyl-4-isothiazoline-3-one, 4,5-dichloro-2-methyl-4-isothiazoline-3-one, 2-ethyl-4-isothiazoline-3-one, 2-n-octyl-4-isothiazoline-3-one, 5-chloro-2-ethyl-4-isothiazoline-3-one, 5-chloro-2-t-octyl-4-isothiazoline-3-one, 4,5-dichloro-2-n-octyle-4-isothiazoline-3-one, 4,5-dichloro-2-cyclohexyl-4-isothiazoline-3-one, and 1,2-benzoisothiazoline-3-one may be mentioned, and furthermore, complex compounds thereof formed using magnesium chloride, magnesium nitrate, copper chloride, copper nitrate, calcium chloride, or the like may also be mentioned.

Those isothiazolone-based compounds may be used alone, or at least two types thereof may be used in combination.

[Chem. 3]

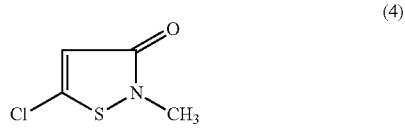

Although the addition amount of the isothiazolone-based compound when algae are generated in a cooling water system is changed depending on the above factor influencing on the peeling properties of algae and the addition amount (residual chlorine concentration in a cooling water system) of the antimicrobial agent, the addition amount is preferably 0.1 to 1,000 mg/L, particularly preferably 0.5 to 100 mg/L, and further preferably 1 to 10 mg/L. When the addition amount of the isothiazolone-based compound is in the range described above, a sufficient algicidal effect can be obtained.

As described above, a suitable addition amount of the isothiazolone-based compound is preferably adjusted in accordance with the factors influencing on the peeling properties of algae described above. Although the addition amount of the isothiazolone-based compound cannot be determined only in accordance with the addition amount (residual chlorine concentration in a cooling water system) of the antimicrobial agent, as one example, in the case in which the residual chlorine concentration by the antimicrobial agent is less than 1 mg-$Cl_2$/L or 1 mg-$Cl_2$/L or more, when the addition amount is adjusted in a range of 0.5 to 20 mg/L or in a range of 0.1 to 10 mg/L, respectively, an excellent effect may be obtained in some cases.

When algae are generated, the isothiazolone-based compound is added to a position at which algae are generated or in the vicinity thereof, such as an upstream side in the vicinity of the position at which algae are generated, a cooling water pit, and a water spray plate. As for the isothiazolone-based compound, if the above suitable addition concentration may also be maintained, the addition may be performed either in a continuous manner or an intermittent manner.

The isothiazolone-based compound is preferably added when the generation of algae is recognized, and when the death of algae is confirmed, the addition is preferably finished.

The generation of algae indicates the case in which algae adhere to a water spray plate, fillers, a cooling water pit, and the like in a system and tend to proliferate, and the death indicates the case in which adhering algae are peeled and removed away.

[Antimicrobial and Algicidal Agent]

The antimicrobial and algicidal agent of the present invention contains an antimicrobial agent and an isothiazolone-based compound. The antimicrobial agent may be a chlorosulfamic acid (salt). The antimicrobial agent may be a combination between a chlorine-based oxidizing agent and a sulfamic acid compound. As described above, since the isothiazolone-based compound is a compound to be added when algae are generated, the antimicrobial and algicidal agent is preferably a two-component type agent in which the antimicrobial agent and the isothiazolone-based compound are separated from each other.

In the antimicrobial and algicidal method for a cooling water system of the present invention, if necessary, besides the antimicrobial agent and the isothiazolone-based compound described above, other chemical agents, such as a scale inhibitor, a corrosion inhibitor, and a pH adjuster, may also be added. Hence, the antimicrobial and algicidal agent of the present invention may further contain those other chemical agents.

EXAMPLES

Hereinafter, the present invention will be described in detail with reference to Examples.

Examples 1 to 5 and Comparative Examples 1 to 17

A test water system containing algae was prepared as described below.

Secondary treated water obtained by filtrating sewage using a filter having a pore diameter of 0.1 μm was received in a beaker having a volume of 1 L, and to this secondary treated water, 1 g of algae sampled from each of cooling towers A, B, and C in which an antimicrobial treatment was performed using a chlorosulfamic acid was added. Algae A sampled from the cooling tower A were diatoms and contained green algae. Algae B sampled from the cooling tower B were primarily formed of green algae and contained blue-green algae and diatoms. Algae C sampled from the cooling tower C were primarily formed of blue-green algae and contained green algae and diatoms.

After being raveled and sufficiently dispersed in the beaker, the algae A, B, and C were each dispensed into test tubes.

In Examples 1 to 5 and Comparative Examples 8 to 11 and 13 to 16, a chlorosulfamic acid (abbreviated as "CSA", and the addition amount represents the residual chlorine concentration) and one of 5-chloro-2-methyl-4-isothiazolone-3-one (abbreviated as "MIT"), 2,2-dibromo-3-nitrilopropion amide (abbreviated as "DBNPA"), and 2-bromo-2-nitro-1, 3-propanediol (abbreviated as "BNP) were added to each test tube so as to have predetermined concentrations shown in Table 1. In Comparative Example 6, MIT was only added. In Comparative Example 7, DBNPA was only added. In Comparative Example 12, BNP was only added. In Comparative Example 17, no chemical agents were added. Subsequently, after the test tubes were left for 3 days at a north-side window so as not to be exposed to direct sunlight, the conditions of the algae were observed by visual inspection and evaluated in accordance with the following criteria. The results are shown in Table 1.

<Evaluation Criteria>
−: Reduction (death) of algae is apparently observed from the start of the test.
±: Condition is the same as that at the start of the test.
+: Slight increase of algae is observed as compared to the condition at the start of the test.
++: Apparent increase of algae is observed as compared to the condition at the start of the test.
+++: Significant increase of algae is observed as compared to the condition at the start of the test.

TABLE 1

| | CSA Addition Amount (mg-Cl$_2$/L) | Algicidal Agent Type | Addition Amount (mg/L) | Algae A | Algae B | Algae C |
|---|---|---|---|---|---|---|
| Comparative Example 1 | 0.5 | No Addition | | +++ | ++ | +++ |
| Comparative Example 2 | 1 | No Addition | | +++ | ++ | +++ |
| Comparative Example 3 | 5 | No Addition | | +++ | ++ | +++ |
| Comparative Example 4 | 10 | No Addition | | +++ | + | ++ |
| Comparative Example 5 | 20 | No Addition | | +++ | + | ++ |
| Comparative Example 6 | No Addition | MIT | 2 | ++ | + | +++ |
| Example 1 | 0.5 | MIT | 2 | + | ± | ± |
| Example 2 | 0.5 | MIT | 5 | − | − | − |
| Example 3 | 1 | MIT | 2 | − | − | ± |
| Example 4 | 5 | MIT | 2 | − | − | − |
| Example 5 | 20 | MIT | 2 | − | − | − |
| Comparative Example 7 | No Addition | DBNPA | 2 | ++ | + | +++ |
| Comparative Example 8 | 0.5 | DBNPA | 2 | ++ | ± | ++ |
| Comparative Example 9 | 1 | DBNPA | 2 | ++ | − | ++ |
| Comparative Example 10 | 5 | DBNPA | 2 | + | − | ++ |
| Comparative Example 11 | 20 | DBNPA | 2 | + | − | + |
| Comparative Example 12 | No Addition | BNP | 2 | ++ | ++ | +++ |
| Comparative Example 13 | 0.5 | BNP | 2 | ++ | ++ | ++ |
| Comparative Example 14 | 1 | BNP | 2 | ++ | + | ++ |
| Comparative Example 15 | 5 | BNP | 2 | + | + | ++ |
| Comparative Example 16 | 20 | BNP | 2 | + | − | + |
| Comparative Example 17 | No Addition | No Addition | | +++ | ++ | +++ |

As apparent from Table 1, among Comparative Examples 1 to 5 in which the chlorosulfamic acid was only added, the results of Comparative Examples 1 to 3 in which a small amount was added are similar to the result of Comparative Example 17 in which no addition was performed, and proliferation of the algae A to C cannot be suppressed at all. In Comparative Examples 4 and 5 in which the addition amount was increased to 10 to 20 mg-Cl$_2$/L, a sufficient effect also cannot be obtained.

In Comparative Examples 7 and 12 in which DBNPA or BNP was only added, a sufficient effect cannot be obtained. In each of Comparative Examples 8 to 10 and 13 to 15 in which DBNPA or BNP was used together with a small amount of the chlorosulfamic acid, a sufficient effect cannot be obtained. Even in Comparative Examples 11 and 16 in which the addition amount of the chlorosulfamic acid was increased to 20 mg-Cl$_2$/L, a slight increase of algae is also recognized.

In Comparative Example 6 in which MIT was only added, a sufficient effect cannot be obtained.

On the other hand, in Example 1 in which a very small amount, such as 0.5 mg-Cl$_2$/L, of the chlorosulfamic acid was used together with MIT, an excellent effect can be obtained. In Example 3 in which the addition amount of the chlorosulfamic acid was slightly increased to 1 mg-Cl$_2$/L, a significantly excellent effect is obtained which is approximately equivalent to that obtained in Examples 4 and 5 in which the addition amount of the chlorosulfamic acid was further increased to 5 to 20 mg-Cl$_2$/L.

From the results of Examples 1 to 5 and Comparative Examples 1 to 17, it is found that in a water system in which if a large amount of the chlorosulfamic acid is only added or if MIT is only added, the algicidal effect is hardly obtained, when the chlorosulfamic acid and MIT are used in combination, algae can be sufficiently removed. In addition, it is found that when the chlorosulfamic acid and MIT are used in combination, even if the addition concentration of the chlorosulfamic acid is low, a sufficient algicidal effect can be obtained.

Examples 6 to 8

By the use of actual machines shown in Table 2, the effect of using the antimicrobial and algicidal agent of the present invention was confirmed under the conditions shown in Table 2. The results are shown in Table 2.

TABLE 2

|  | Example 6<br>Cooling Water System I | Example 7<br>Cooling Water System II | Example 8<br>Cooling Water System III |
| --- | --- | --- | --- |
| Machine | Air Conditioning Rectangular Type Cooling Tower 100 Refrigeration Ton | Industrial Rectangular Type Cooling Tower 300 Refrigeration Ton | Industrial Rectangular Type Cooling Tower 100 Refrigeration Ton |
| CSA Residual Chlorine Concentration (mg—$Cl_2$/L) | 3.7 | 1.3 | 0.5 |
| Finding | Green Algae Mat (Thickness: 5 mm) on Water Spray Plate | Adhesion of Green Seaweed-Like Algae to Edges of Fillers and Fringes of Pit | Adhesion of Brown Algae to Water Spray Plate and Pit |
| Countermeasure | Intermittent Addition of 3 mg/L of MIT Once Per Week Addition Position: Water Spray Plate | Intermittent Addition of 2 mg/L of MIT Twice Per Week Addition Position: Cooling Water Pit | Continuous Addition of MIT 1 mg/L to Blow Water Addition Position: Cooling Water Pit |
| Result | Mat is Removed After 4 Weeks | Effect is Confirmed within 2 Weeks Approximately All Algae are Removed after 6 Weeks | Algae are Removed within 2 Weeks |

From Table 2, it is found that according to the present invention, algae generated in a cooling water system in which an antimicrobial treatment is performed using a chlorosulfamic acid can be effectively killed and removed.

Although specific aspects of the present invention have thus been described, it is apparent to a person skilled in the art that various changes and modifications may be performed without departing from the spirit and the scope of the present invention.

This application claims the benefit of Japanese Patent Application No. 2013-197153 filed Sep. 24, 2013, which is hereby incorporated by reference herein in its entirety.

The invention claimed is:

1. An antimicrobial and algicidal composition for a cooling water system subjected to an antimicrobial treatment with a chlorosulfamic acid and/or a chlorosulfamic acid salt, which is added when algae including diatoms, green algae, and blue-green algae are generated, comprising:

an antimicrobial agent; and
an isothiazolone-based compound,
wherein the antimicrobial agent is one of the following a) to d)

a) a chlorine-based oxidizing agent and sulfamic acid and/or sulfamic acid salt,
b) N chlorosulfamic acid,
c) N-chlorosulfamic acid salt, and
d) N-chlorosulfamic acid and N-chlorosulfamic acid salt, the chlorine-based oxidizing agent is hypochlorous acid and/or hypochlorous acid salt, and
the isothiazolone-based compound is 5-chloro-2-methyl-4-isothiazoline-3-one,
and wherein a combination of the antimicrobial agent and isothiazolone-based compound exhibits synergy.

2. The antimicrobial and algicidal composition for a cooling water system according to claim 1, wherein the chlorosulfamic acid salt is a sodium salt, a potassium salt, a calcium salt, a strontium salt, a barium salt, a manganese salt, copper salt, a zinc salt, an iron salt, a cobalt salt, a nickel salt, an ammonium salt, or a guanidine salt.

3. The antimicrobial and algicidal composition for a cooling water system according to claim 1, further comprising a scale inhibitor, a corrosion inhibitor, or a pH adjuster.

* * * * *